US007770181B2

(12) United States Patent
Snover et al.

(10) Patent No.: US 7,770,181 B2
(45) Date of Patent: Aug. 3, 2010

(54) SYSTEM AND METHOD FOR TRANSFERRING COMPUTER-READABLE OBJECTS ACROSS A REMOTE BOUNDARY

(75) Inventors: Jeffrey P. Snover, Woodinville, WA (US); Rajesh Chandrashekaran, Andhra Pradesh (IN); Shankara Shastry, Andhra Pradesh (IN); Hitesh Raigandhi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 761 days.

(21) Appl. No.: 10/759,737

(22) Filed: Jan. 16, 2004

(65) Prior Publication Data
US 2005/0172300 A1 Aug. 4, 2005

(51) Int. Cl.
*G06F 9/44* (2006.01)
(52) U.S. Cl. .................. 719/315; 719/316; 719/330
(58) Field of Classification Search ............ 719/315, 719/316, 330
See application file for complete search history.

(56) References Cited

U.S. PATENT DOCUMENTS

| 5,657,480 | A | 8/1997 | Jacobson |
| 5,887,141 | A | 3/1999 | Trugman |
| 5,946,463 | A | 8/1999 | Carr et al. |
| 6,198,824 | B1 | 3/2001 | Shambroom |
| 6,477,701 | B1 * | 11/2002 | Heistermann et al. ....... 717/108 |
| 6,675,193 | B1 | 1/2004 | Slavin et al. |
| 6,808,472 | B1 | 10/2004 | Hickman |
| 7,027,975 | B1 | 4/2006 | Pazandak et al. |
| 7,036,010 | B2 | 4/2006 | Wray |
| 7,039,724 | B1 | 5/2006 | Lavian et al. |
| 7,058,645 | B2 * | 6/2006 | Seto et al. .................. 707/101 |
| 7,140,025 | B1 | 11/2006 | Dillow et al. |
| 2002/0019844 | A1 | 2/2002 | Kurowski et al. |

(Continued)

FOREIGN PATENT DOCUMENTS

WO 0212982 A2 2/2002

(Continued)

OTHER PUBLICATIONS

Marjan Hericko et al., "Object Serialization Analysis and Comparison in Java and .NET," Aug. 2003, ACM SIGPLAN Notices, vol. 38(8), pp. 44-54.*

(Continued)

*Primary Examiner*—Li B Zhen
(74) *Attorney, Agent, or Firm*—Lee & Hayes, PLLC

(57) ABSTRACT

A system and method for securely transferring computer-readable objects across a remote boundary is provided. The method decomposes any type of object into a hierarchy of sub-components based on a list of known object types. Each sub-component either corresponds to a known object type or an unknown object type. The unknown object types may be decomposed further into known object types at another level in the hierarchy. The known objects in the hierarchy are serialized into a package that is transmitted to a remote entity. The remote entity reconstructs the hierarchy. For any of the known object types, the remote entity instantiates an object of the known object type and populates the object with information transmitted in the package. The decomposition may be limited by specifying a level for the hierarchy, specifying a number that limits the known objects that are serialized, or specifying the properties within the object to serialize.

28 Claims, 13 Drawing Sheets

U.S. PATENT DOCUMENTS

| | | | |
|---|---|---|---|
| 2002/0143866 A1 | 10/2002 | Lewis et al. | |
| 2003/0025727 A1 | 2/2003 | Rath et al. | |
| 2003/0177187 A1 | 9/2003 | Levine et al. | |
| 2003/0182308 A1* | 9/2003 | Ernst et al. | 707/103 Z |
| 2003/0191803 A1* | 10/2003 | Chinnici et al. | 709/203 |
| 2003/0204645 A1 | 10/2003 | Sharma et al. | |
| 2004/0039964 A1* | 2/2004 | Russell et al. | 714/25 |
| 2004/0078341 A1 | 4/2004 | Steichen | |
| 2004/0139305 A1 | 7/2004 | Arimilli et al. | |
| 2005/0154978 A1* | 7/2005 | Albornoz et al. | 715/513 |
| 2005/0198648 A1 | 9/2005 | Wray et al. | |

FOREIGN PATENT DOCUMENTS

| | | |
|---|---|---|
| WO | WO2005074408 | 8/2005 |

OTHER PUBLICATIONS

N. Bhatti et al., "Object Serialization and Deserialization Using XML," 2000, Tata McGraw-Hill Publishing.*

Bruno R. Preiss, "Data Structores and Algorithms with Object-Oriented Design Patterns in C++," 1997, pp. 596, 598 and 599, retrieved from internet (http://www.brpreiss.com/books/opus4/html).*

PCT International Search Report and Written Opinion for Application No. PCT/US04/23467, dated May 11, 2006, 9 pages.

Chinese Office Action for PCT Application No. 200480001253.5, dispatched Oct. 10, 2008 (11 pages).

Nacar, et al., "Designing a Grid Computing Environment Shell Engine", Proceedings of the 2003 International Conference on Internet Computing, Jun. 2003, pp. 1-5.

Unknown, "Sun Cluster 2.2 System Admininstration Guide Jul. 2000 Release",retrieved at //dlc.sun.com/pdf/806/5343/206-50343.pdf>>, Jul. 2000, pp. 27-41.

* cited by examiner

```
[cmdletDeclaration ([verb]\[noun])]
public class <command name> : CmdLet
{

[ParsingCommandLineInput]
    public string Name;

[ParsingCommandLineInput]
    public Bool Recurse;

private <type>  <name> startProcessing();

processRecord();

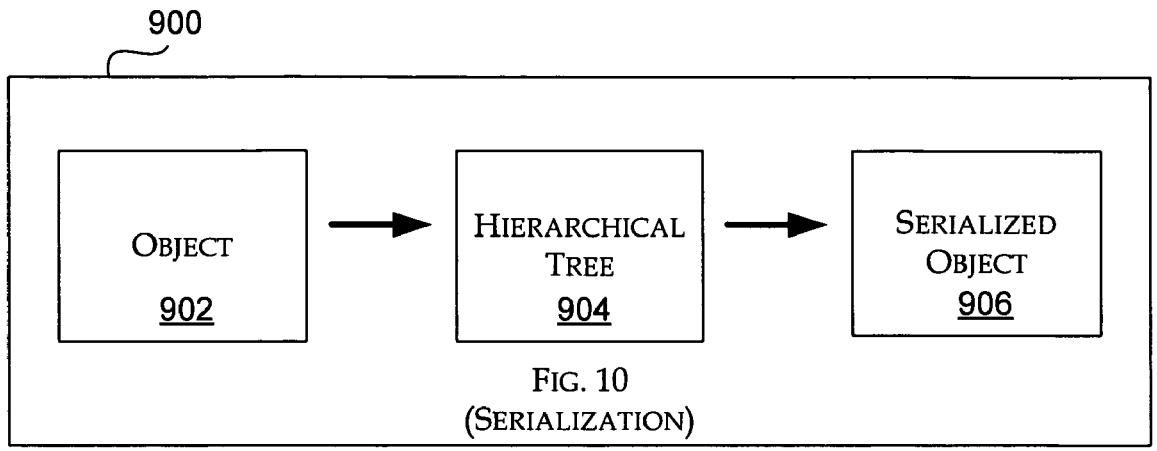
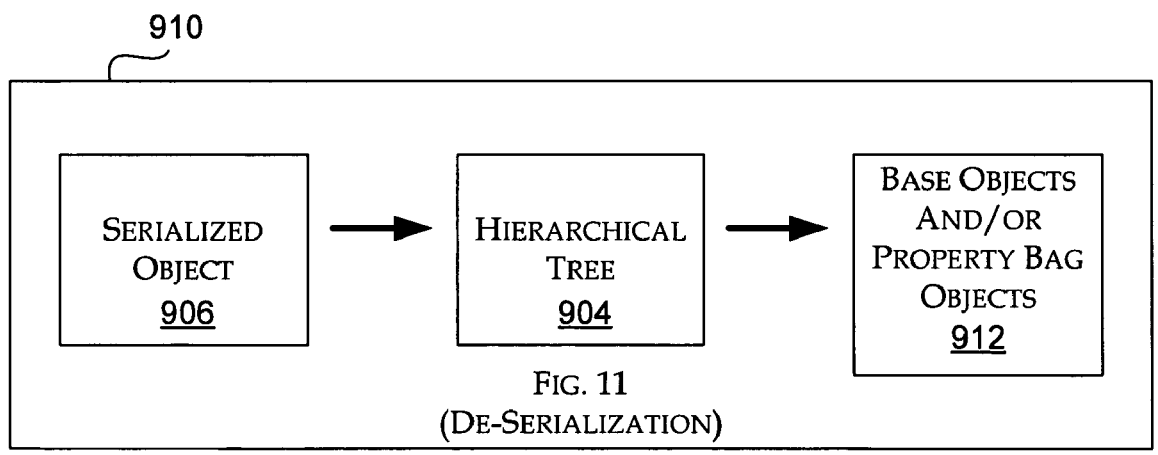
Fig. 9

| | Name | Value | Type | Is Type | Was Type | Treat As Type |
|---|---|---|---|---|---|---|
| 1220 → (header) | | | | | | |
| 1222 → | Employee Number | 28731 | Int | Null | Int | Null |
| 1224 → | Name | John Doe | String | Null | Null | Null |
| 1226 → | Address | | PB | Null | Address | Null |
| 1228 → | SSN | 555-55-5555 | String | Null | String | Null |
| 1230 → | Birthdate | | DateTime | Null | DateTime | Null |
| | ⋮ | | | | | |

| | Name | Value | Type | Is Type | Was Type | Treat As Type |
|---|---|---|---|---|---|---|
| 1242 → | Street | 101 First St. | String | Null | String | Null |
| 1244 → | City | Redmond | String | Null | String | Null |
| 1246 → | State | WA | String | Null | String | Null |
| 1248 → | Zip Code | 98520 | Int | Null | Int | Null |

Fig. 12

US 7,770,181 B2

SYSTEM AND METHOD FOR TRANSFERRING COMPUTER-READABLE OBJECTS ACROSS A REMOTE BOUNDARY

TECHNICAL FIELD

Subject matter disclosed herein relates to remote computing systems, and in particular to methods for transferring computer-readable objects during remote communications.

BACKGROUND OF THE INVENTION

Today, during software development, developers utilize a programming concept called object-oriented programming. In object-oriented programming, computer-readable objects (objects) are defined. The objects have properties and methods. The properties store data that pertains to the object. The methods perform functionality associated with the object and typically, provide interfaces to the properties defined in the object. Even though programming with objects provides great versatility, using objects across remote boundaries, such as between different computers, presents some challenges.

One challenge is determining the mechanism for transferring the objects between the two computers. In certain environments, the executable code (methods) for an object, along with its properties, are transferred to a requesting computer from a server computer. However, this solution may pose a security risk to the requesting computer if the executable code that is transferred performs a malicious action, such as deleting files. Thus, other solutions have been developed to minimize this potential risk.

One current solution is a technology called Web Services Technology. Using this technology, the object is converted into XML (extended mark-up language), which is transmitted to the requesting computer. Upon receiving the XML, the requesting computer converts the XML back into the object. The requesting computer may than access the object's properties and invoke the object's methods. Using this technology, the requesting computer is responsible for knowing and trusting the server from which the object is received. In addition, for any object that wishes to communicate with the requesting computer, the software developer, who developed the object, must implement a special interface to handle the communication. The special interface provides a mechanism for serializing and de-serializing the object in order for the object to be transferred.

Even though this Web Service solution provides a robust environment for transferring objects across remote boundaries, the technology is restrictive and burdensome. In some environments, such as in system administration environments, forcing software developers to implement a special interface for objects that system administration tasks wish to monitor, is not a viable solution. For example, requiring the developers to implement these special interfaces is not a trivial matter, and requires the developers to divert their attention away from their primary objective—implementing the object for their own particular application. Thus, many developers do not implement the special interfaces for their objects, and thus, these objects are not accessible.

Therefore, there is a need for a method of transferring objects across a remote boundary that is secure, not restrictive, and not burdensome to software developers.

SUMMARY OF THE INVENTION

The invention is directed to mechanisms and techniques for remote communication of objects. Briefly stated, a system and method for securely transferring computer-readable objects across a remote boundary is provided. The method decomposes any type of object into a hierarchy of sub-components based on a list of known object types. Each sub-component either corresponds to a known object type or an unknown object type. The unknown object types may be decomposed further into known object types at another level in the hierarchy. The known objects in the hierarchy are serialized into a package that is transmitted to a remote entity. The remote entity reconstructs the hierarchy. For any of the known object types, the remote entity instantiates an object of the known object type and populates the object with information transmitted in the package. The decomposition may be limited by specifying a level for the hierarchy, specifying a number that limits the known objects that are serialized, or specifying the properties within the object to serialize.

BRIEF DESCRIPTION OF THE DRAWINGS

FIG. 6 is an exemplary data structure for specifying a cmdlet suitable for use within the administrative tool framework shown in FIG. 2.

FIG. 9 is a block diagram illustrating an overview of the serialization process and de-serialization process suitable for use in FIG. 8.

FIG. 12 is a graphical representation of a property bag hierarchy generated during the serialization process shown in FIG. 10.

DETAILED DESCRIPTION

Briefly stated, the present system and method for transferring objects across a remote boundary provides a secure method for transferring objects. In addition, the present system and method does not place any artificial requirements on objects. Therefore, software developers do not incur any burden for supporting remote operations using their objects. Thus, unlike existing systems, any object on any computer or in another process on the same computer may be transferred across the remote boundary to a requesting process. In addition, the present system and method for transferring objects does not require both computers to execute the same version of software. Rather, the method incorporates a protocol negotiation process that not only provides a mechanism for supporting communication between two different versions, but also minimizes the amount of data transferred over the remote boundary.

The following detailed description is divided into several sections. In general, the present system and method is described within the context of an exemplary administrative tool environment. However, after reading the following description, those skilled in the art will appreciate that the present method may be implemented in other exemplary environments, which are also included within the scope of the appended claims.

A first section describes an illustrative computing environment in which an exemplary administrative tool environment may operate. A second section describes an exemplary framework for the administrative tool environment. Subsequent sections describe individual components of the exemplary framework and the operation of these components. For example, the section on "Exemplary Remote Processing of a Cmdlet", in conjunction with FIGS. 7-13, describes an exemplary system and method for transferring objects across a remote boundary.

Exemplary Computing Environment

Figure 1:
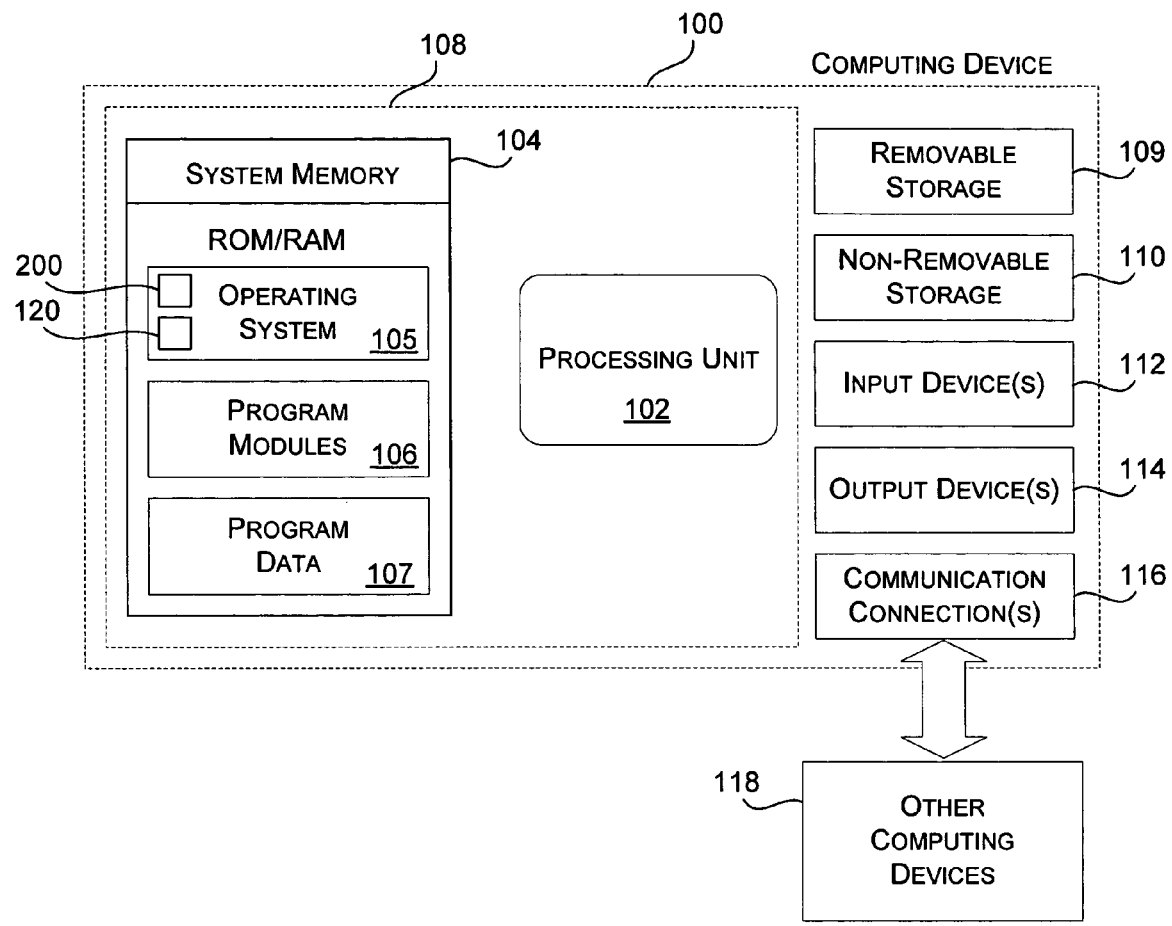
FIG. 1 illustrates an exemplary computing device on which an exemplary administrative tool framework may be implemented.

FIG. 1 illustrates an exemplary computing device that may be used in an exemplary administrative tool environment. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. The operating system 106 include a component-based framework 120 that supports components (including properties and events), objects, inheritance, polymorphism, reflection, and provides an object-oriented component-based application programming interface (API), such as that of the .NET™ Framework manufactured by Microsoft Corporation, Redmond, Wash. The operating system 105 also includes an administrative tool framework 200 that interacts with the component-based framework 120 to support development of administrative tools (not shown). This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Exemplary Administrative Tool Framework

Figure 2:
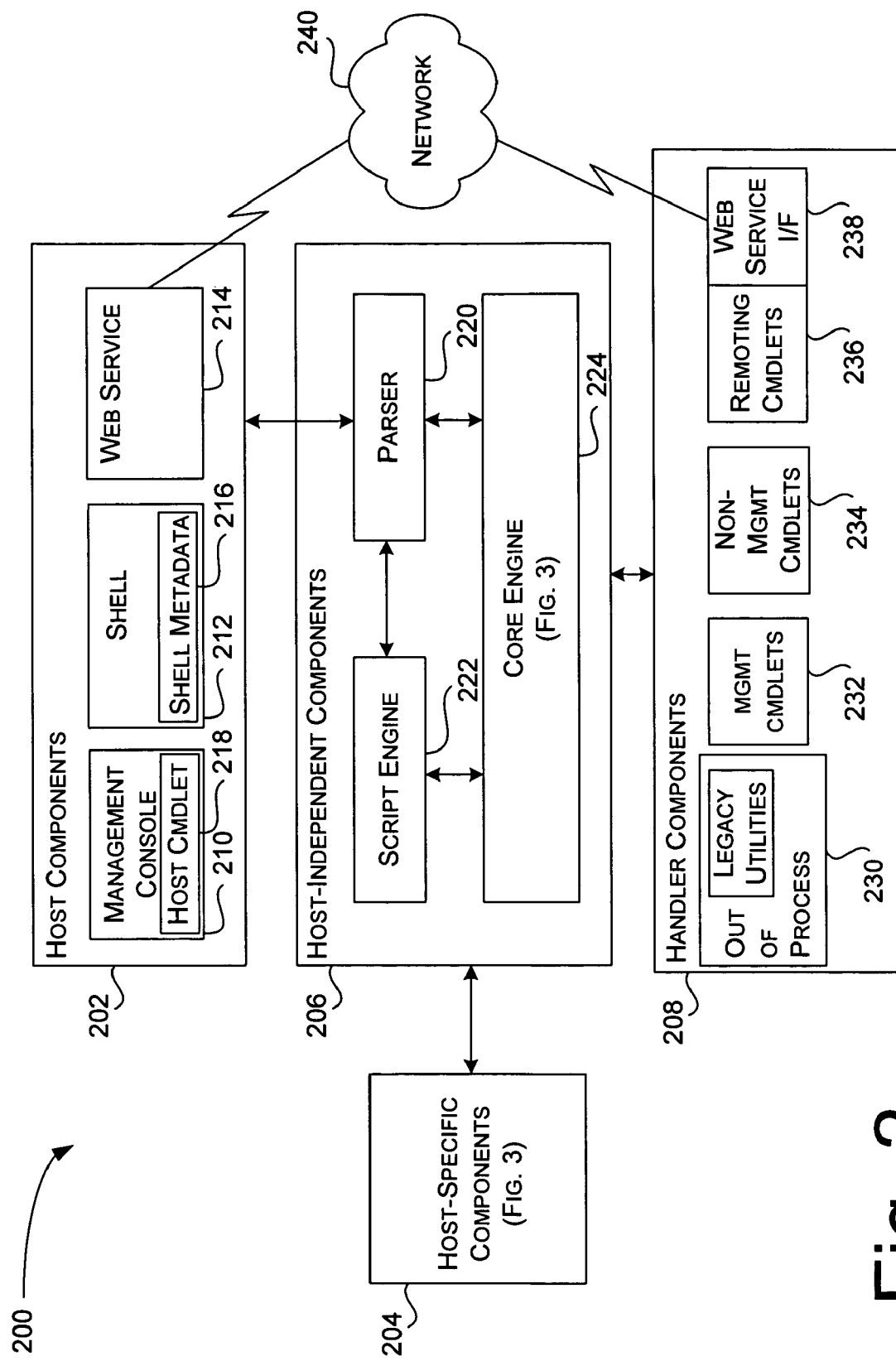
FIG. 2 is a block diagram generally illustrating an overview of an exemplary administrative tool framework.

FIG. 2 is a block diagram generally illustrating an overview of an exemplary administrative tool framework 200. Administrative tool framework 200 includes one or more host components 202, host-specific components 204, host-independent components 206, and handler components 208. The host-independent components 206 may communicate with each of the other components (i.e., the host components 202, the host-specific components 204, and the handler components 208). Each of these components are briefly described below and described in further detail, as needed, in subsequent sections.

Host Components

The host components 202 include one or more host programs (e.g., host programs 210-214) that expose automation features for an associated application to users or to other programs. Each host program 210-214 may expose these automation features in its own particular style, such as via a command line, a graphical user interface (GUI), a voice recognition interface, application programming interface (API), a scripting language, a web service, and the like. However, each of the host programs 210-214 expose the one or more automation features through a mechanism provided by the administrative tool framework.

In this example, the mechanism uses cmdlets to surface the administrative tool capabilities to a user of the associated host program 210-214. In addition, the mechanism uses a set of interfaces made available by the host to embed the administrative tool environment within the application associated with the corresponding host program 210-214. Throughout the following discussion, the term "cmdlet" is used to refer to commands that are used within the exemplary administrative tool environment.

Cmdlets correspond to commands in traditional administrative environments. However, cmdlets are quite different than these traditional commands. For example, cmdlets are typically smaller in size than their counterpart commands because the cmdlets can utilize common functions provided by the administrative tool framework, such as parsing, data validation, error reporting, and the like. Because such common functions can be implemented once and tested once, the use of cmdlets throughout the administrative tool framework allows the incremental development and test costs associated with application-specific functions to be quite low compared to traditional environments.

In addition, in contrast to traditional environments, cmdlets do not need to be stand-alone executable programs. Rather, cmdlets may run in the same processes within the administrative tool framework. This allows cmdlets to exchange "live" objects between each other. This ability to exchange "live" objects allows the cmdlets to directly invoke methods on these objects.

In overview, each host program 210-214 manages the interactions between the user and the other components within the administrative tool framework. These interactions may include prompts for parameters, reports of errors, and the like. Typically, each host program 210-213 may provide its own set of specific host cmdlets (e.g., host cmdlets 218). For example, if the host program is an email program, the host program may provide host cmdlets that interact with mailboxes and messages. Even though FIG. 2 illustrates host programs 210-214, one skilled in the art will appreciate that host components 202 may include other host programs associated with existing or newly created applications. These other host programs will also embed the functionality provided by the administrative tool environment within their associated application.

In the examples illustrated in FIG. 2, a host program may be a management console (i.e., host program 210) that provides a simple, consistent, administration user interface for users to create, save, and open administrative tools that manage the hardware, software, and network components of the computing device. To accomplish these functions, host program 210 provides a set of services for building management GUIs on top of the administrative tool framework. The GUI interactions may also be exposed as user-visible scripts that help teach the users the scripting capabilities provided by the administrative tool environment.

In another example, the host program may be a command line interactive shell (i.e., host program 212). The command line interactive shell may allow shell metadata 216 to be input on the command line to affect processing of the command line.

In still another example, the host program may be a web service (i.e., host program 214) that uses industry standard specifications for distributed computing and interoperability across platforms, programming languages, and applications. In another example, illustrated in FIG. 7, the host program may provide a remote interface for communicating with a remote computer.

In addition to these examples, third parties may add their own host components by creating "third party" or "provider" interfaces and provider cmdlets that are used with their host program or other host programs. The provider interface exposes an application or infrastructure so that the application or infrastructure can be manipulated by the administrative tool framework. The provider cmdlets provide automation for navigation, diagnostics, configuration, lifecycle, operations, and the like. The provider cmdlets exhibit polymorphic cmdlet behavior on a completely heterogeneous set of data stores. The administrative tool environment operates on the provider cmdlets with the same priority as other cmdlet classes. The provider cmdlet is created using the same mechanisms as the other cmdlets. The provider cmdlets expose specific functionality of an application or an infrastructure to the administrative tool framework. Thus, through the use of cmdlets, product developers need only create one host component that will then allow their product to operate with many administrative tools. For example, with the exemplary administrative tool environment, system level graphical user interface help menus may be integrated and ported to existing applications.

Host-Specific Components

The host-specific components 204 include a collection of services that computing systems (e.g., computing device 100 in FIG. 1) use to isolate the administrative tool framework from the specifics of the platform on which the framework is running. Thus, there is a set of host-specific components for each type of platform. The host-specific components allow the users to use the same administrative tools on different operating systems.

Figure 3:
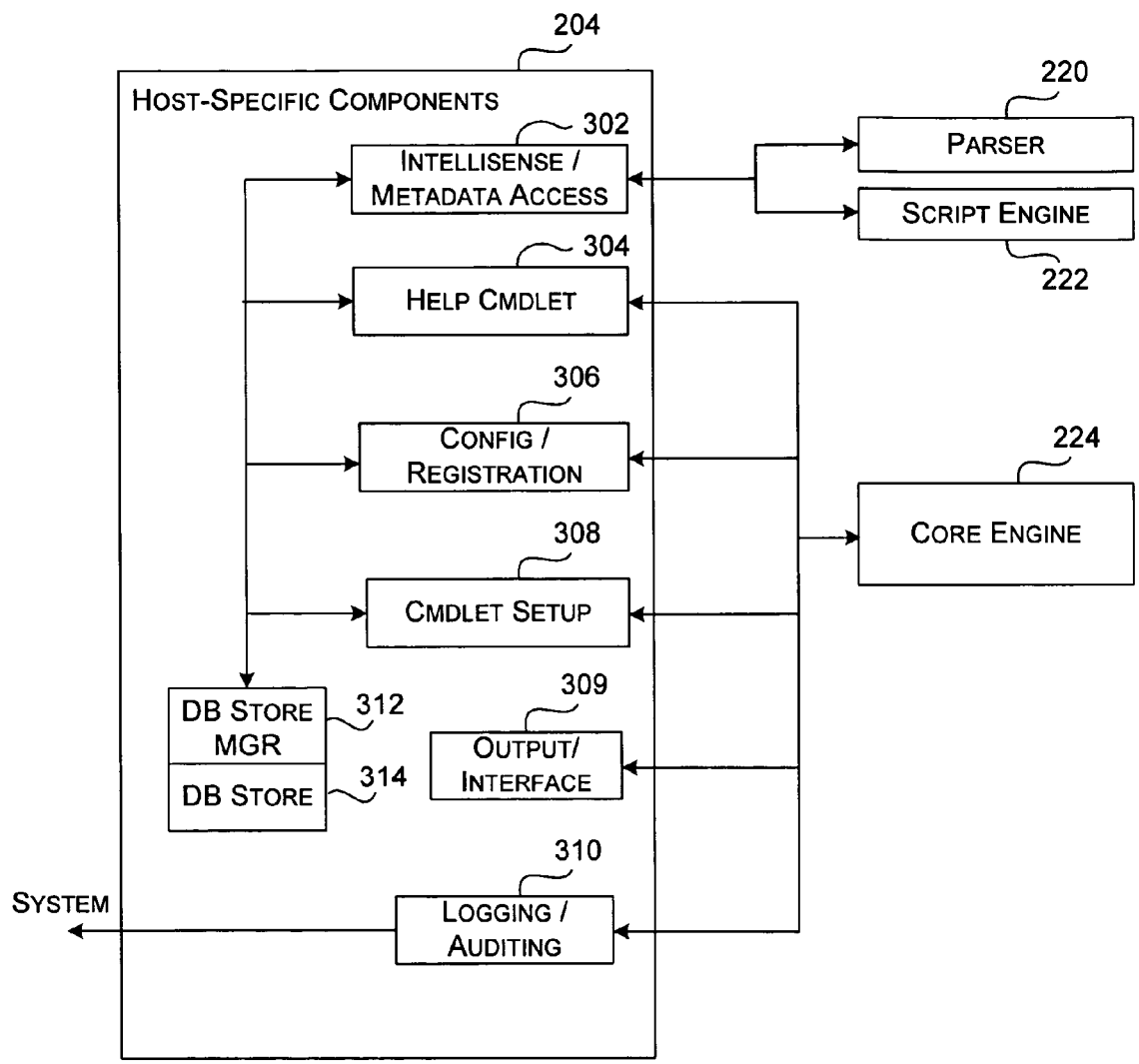
FIG. 3 is a block diagram illustrating components within the host-specific components of the administrative tool framework shown in FIG. 2.

Turning briefly to FIG. 3, the host-specific components 204 may include an intellisense/metadata access component 302, a help cmdlet component 304, a configuration/registration component 306, a cmdlet setup component 308, and an output interface component 309 Components 302-308 communicate with a database store manager 312 associated with a database store 314. The parser 220 and script engine 222 communicate with the intellisense/metadata access component 302. The core engine 224 communicates with the help cmdlet component 304, the configuration/registration component 306, the cmdlet setup component 308, and the output interface component 309. The output interface component 309 includes interfaces provided by the host to out cmdlets. These out cmdlets can then call the host's output object to perform the rendering. Host-specific components 204 may also include a logging/auditing component 310, which the core engine 224 uses to communicate with host specific (i.e., platform specific) services that provide logging and auditing capabilities.

In one exemplary administrative tool framework, the intellisense/metadata access component 302 provides auto-completion of commands, parameters, and parameter values. The help cmdlet component 304 provides a customized help system based on a host user interface.

Handler Components

Referring back to FIG. 2, the handler components 208 includes legacy utilities 230, management cmdlets 232, non-management cmdlets 234, remoting cmdlets 236, and a web service interface 238. The management cmdlets 232 (also referred to as platform cmdlets) include cmdlets that query or manipulate the configuration information associated with the computing device. Because management cmdlets 232 manipulate system type information, they are dependant upon a particular platform. However, each platform typically has management cmdlets 232 that provide similar actions as management cmdlets 232 on other platforms. For example, each platform supports management cmdlets 232 that get and set system administrative attributes (e.g., get/process, set/IPAddress). The host-independent components 206 communicate with the management cmdlets via cmdlet objects generated within the host-independent components 206.

The non-management cmdlets 234 (sometimes referred to as base cmdlets) include cmdlets that group, sort, filter, and perform other processing on objects provided by the management cmdlets 232. The non-management cmdlets 234 may also include cmdlets for formatting and outputting data associated with the pipelined objects. The non-management cmdlets 234 may be the same on each platform and provide a set of utilities that interact with host-independent components 206 via cmdlet objects. The interactions between the non-management cmdlets 234 and the host-independent components 206 allow reflection on objects and allow processing on the reflected objects independent of their (object) type. Thus, these utilities allow developers to write non-management cmdlets once and then apply these non-management cmdlets across all classes of objects supported on a computing system. In the past, developers had to first comprehend the format of the data that was to be processed and then write the application to process only that data. As a consequence, traditional applications could only process data of a very limited scope.

The legacy utilities 230 include existing executables, such as win32 executables that run under cmd.exe. Each legacy utility 230 communicates with the administrative tool framework using text streams (i.e., stdin and stdout), which are a type of object within the object framework. Because the legacy utilities 230 utilize text streams, reflection-based operations provided by the administrative tool framework are not available. The legacy utilities 230 execute in a different process than the administrative tool framework. Although not shown, other cmdlets may also operate out of process.

The remoting cmdlets 236, in combination with the web service interface 238, provide remoting mechanisms to access interactive and programmatic administrative tool environments on other computing devices over a communication media, such as internet or intranet (e.g., internet/intranet 240 shown in FIG. 2). In one exemplary administrative tool framework, the remoting mechanisms support federated services that depend on infrastructure that spans multiple independent control domains. The remoting mechanism allows scripts to execute on remote computing devices. The scripts may be run on a single or on multiple remote systems. The results of the scripts may be processed as each individual script completes or the results may be aggregated and processed en-masse after all the scripts on the various computing devices have completed.

Figure 7:
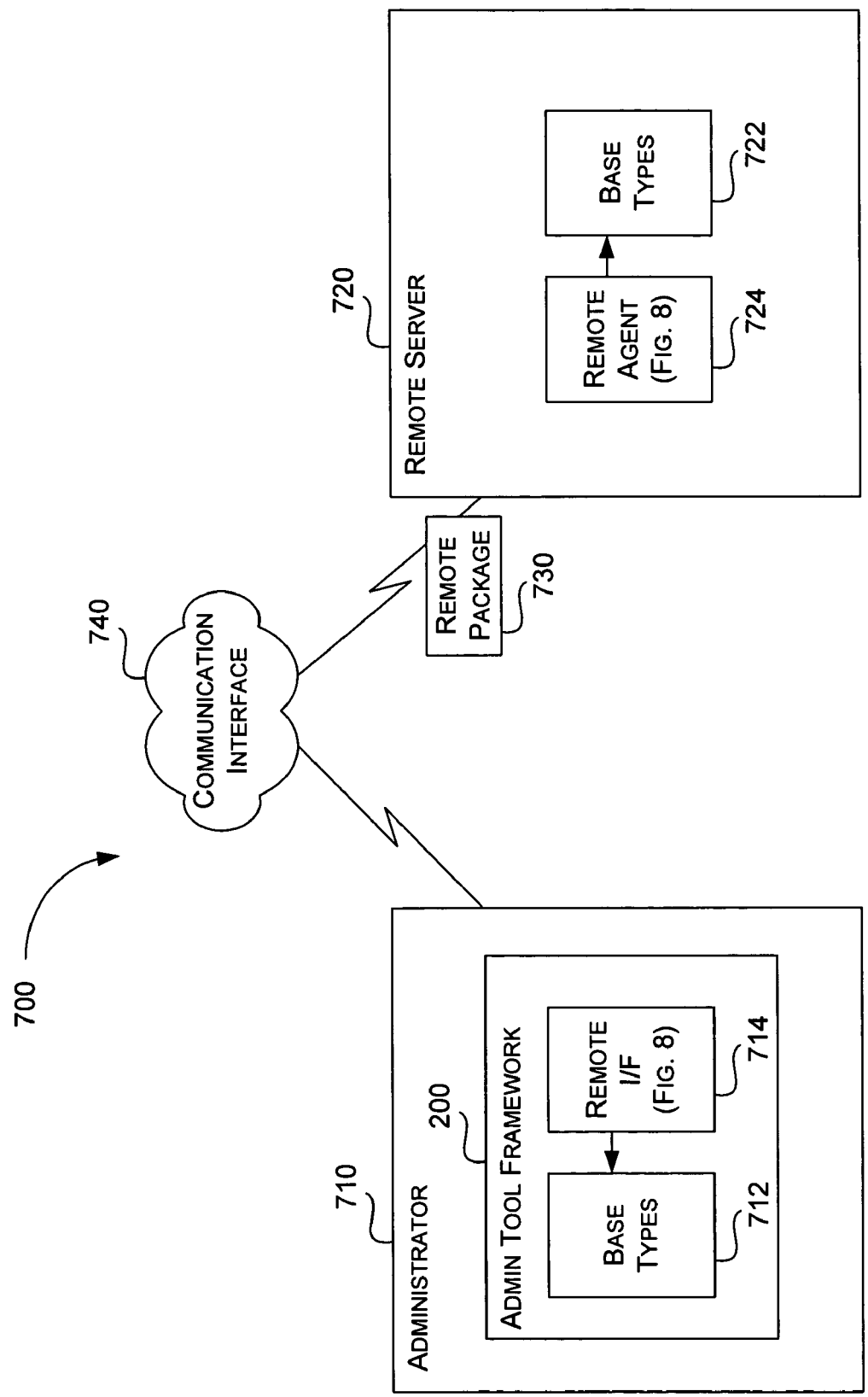
FIG. 7 is a functional block diagram illustrating components within the administrative tool framework shown in FIG. 2 for performing remote processing of cmdlets.

For example, web service 214 shown as one of the host components 202 may be a remote agent. The remote agent handles the submission of remote command requests to the parser and administrative tool framework on the target system. The remoting cmdlets serve as the remote client to provide access to the remote agent. The remote agent and the remoting cmdlets communicate via a parsed stream. This parsed stream may be protected at the protocol layer, or additional cmdlets may be used to encrypt and then decrypt the parsed stream. Exemplary components for processing remote cmdlets and transferring objects between remote processes is illustrated in FIG. 7 and described below in the section entitled "Exemplary Remote Processing of a Cmdlet".

Host-Independent Components

The host-independent components 206 include a parser 220, a script engine 222 and a core engine 224. The host-independent components 206 provide mechanisms and services to group multiple cmdlets, coordinate the operation of the cmdlets, and coordinate the interaction of other resources, sessions, and jobs with the cmdlets.

Exemplary Parser

The parser 220 provides mechanisms for receiving input requests from various host programs and mapping the input requests to uniform cmdlet objects that are used throughout the administrative tool framework, such as within the core engine 224. In addition, the parser 220 may perform data processing based on the input received. The parser 220 of the present administrative tool framework provides the capability to easily expose different languages or syntax to users for the same capabilities. For example, because the parser 220 is responsible for interpreting the input requests, a change to the code within the parser 220 that affects the expected input syntax will essentially affect each user of the administrative tool framework. Therefore, system administrators may provide different parsers on different computing devices that support different syntax. However, each user operating with the same parser will experience a consistent syntax for each cmdlet. In contrast, in traditional environments, each command implemented its own syntax. Thus, with thousands of commands, each environment supported several different syntax, usually many of which were inconsistent with each other.

Exemplary Script Engine

The script engine 222 provides mechanisms and services to tie multiple cmdlets together using a script. A script is an aggregation of command lines that share session state under strict rules of inheritance. The multiple command lines within the script may be executed either synchronously or asynchronously, based on the syntax provided in the input request. The script engine 222 has the ability to process control structures, such as loops and conditional clauses and to process variables within the script. The script engine also manages session state and gives cmdlets access to session data based on a policy (not shown).

Exemplary Core Engine

Figure 4:
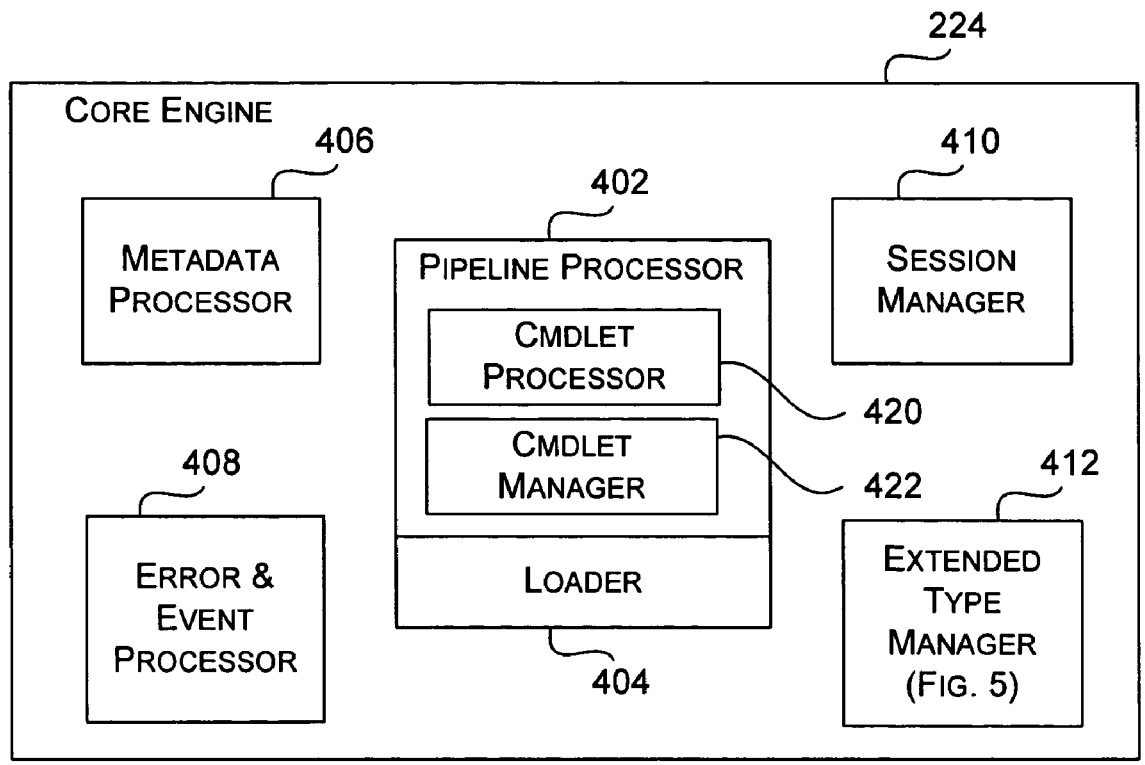
FIG. 4 is a block diagram illustrating components within the core engine component of the administrative tool framework shown in FIG. 2.

The core engine 224 is responsible for processing cmdlets identified by the parser 220. Turning briefly to FIG. 4, an exemplary core engine 224 within the administrative tool framework 200 is illustrated. The exemplary core engine 224 includes a pipeline processor 402, a loader 404, a metadata processor 406, an error & event handler 408, a session manager 410, and an extended type manager 412.

Exemplary Metadata Processor

The metadata processor 406 is configured to access and store metadata within a metadata store, such as database store 314 shown in FIG. 3. The metadata may be supplied via the command line, within a cmdlet class definition, and the like. Different components within the administrative tool framework 200 may request the metadata when performing their processing. For example, parser 202 may request metadata to validate parameters supplied on the command line.

Exemplary Error & Event Processor

The error & event processor 408 provides an error object to store information about each occurrence of an error during processing of a command line. For additional information about one particular error and event processor which is particularly suited for the present administrative tool framework, refer to U.S. patent application Ser. No. 10/413,054, entitled "System and Method for Persisting Error Information in a Command Line Environment", which is owned by the same assignee as the present invention, and is incorporated here by reference.

Exemplary Session Manager

The session manager 410 supplies session and state information to other components within the administrative tool framework 200. The state information managed by the session manager may be accessed by any cmdlet, host, or core engine via programming interfaces. These programming interfaces allow for the creation, modification, and deletion of state information.

Exemplary Pipeline Processor and Loader

The loader 404 is configured to load each cmdlet in memory in order for the pipeline processor 402 to execute the cmdlet. The pipeline processor 402 includes a cmdlet processor 420 and a cmdlet manager 422. The cmdlet processor 420 dispatches individual cmdlets. If the cmdlet requires execution on a remote, or a set of remote machines, the cmdlet processor 420 coordinates the execution with the remoting cmdlet 236 shown in FIG. 2. The cmdlet manager 422 handles the execution of aggregations of cmdlets. The cmdlet manager 422, the cmdlet processor 420, and the script engine 222 (FIG. 2) communicate with each other in order to perform the processing on the input received from the host program 210-214. The communication may be recursive in nature. For example, if the host program provides a script, the script may invoke the cmdlet manager 422 to execute a cmdlet, which itself may be a script. The script may then be executed by the script engine 222.

Exemplary Extended Type Manager

As mentioned above, the administrative tool framework provides a set of utilities that allows reflection on objects and allows processing on the reflected objects independent of their (object) type. The administrative tool framework 200 interacts with the component framework on the computing system (component framework 120 in FIG. 1) to perform this reflection. As one skilled in the art will appreciate, reflection provides the ability to query an object and to obtain a type for the object, and then reflect on various objects and properties associated with that type of object to obtain other objects and/or a desired value.

Even though reflection provides the administrative tool framework 200 a considerable amount of information on objects, traditionally reflection focuses on the type of object. For example, when a database datatable is reflected upon, the information that is returned is that the datatable has two properties: a column property and a row property. These two properties do not provide sufficient detail regarding the "objects" within the datatable. Similar problems arise when reflection is used on extensible markup language (XML) and other objects.

In contrast, extended type manager 412 focuses on the usage of the type rather than the type of object. Thus, with this as its focus, the extended type manager determines whether the object can be used to obtain the required information. Continuing with the above datatable example, knowing that the datatable has a column property and a row property is not particularly interesting. However, by focusing on the usage, the extended type manager associates each row with an "object" and associates each column with a "property" of that "object". Thus, the extended type manager 412 provides a mechanism to create "objects" from any type of precisely parse-able input. In so doing, the extended type manager 412 supplements the reflection capabilities provided by the component-based framework 120 and extends "reflection" to any type of precisely parse-able input.

In overview, the extended type manager is configured to access precisely parse-able input (not shown) and to correlate the precisely parse-able input with a requested data type. The extended type manager 412 then provides the requested information to the requesting component, such as the pipeline processor 402 or parser 220. In the following discussion, precisely parse-able input is defined as input in which properties and values may be discerned. Some exemplary precisely parse-able input include Windows Management Instrumentation (WMI) input, ActiveX Data Objects (ADO) input, eXtensible Markup Language (XML) input, and object input, such as .NET objects. Other precisely parse-able input may include third party data formats.

Figure 5:
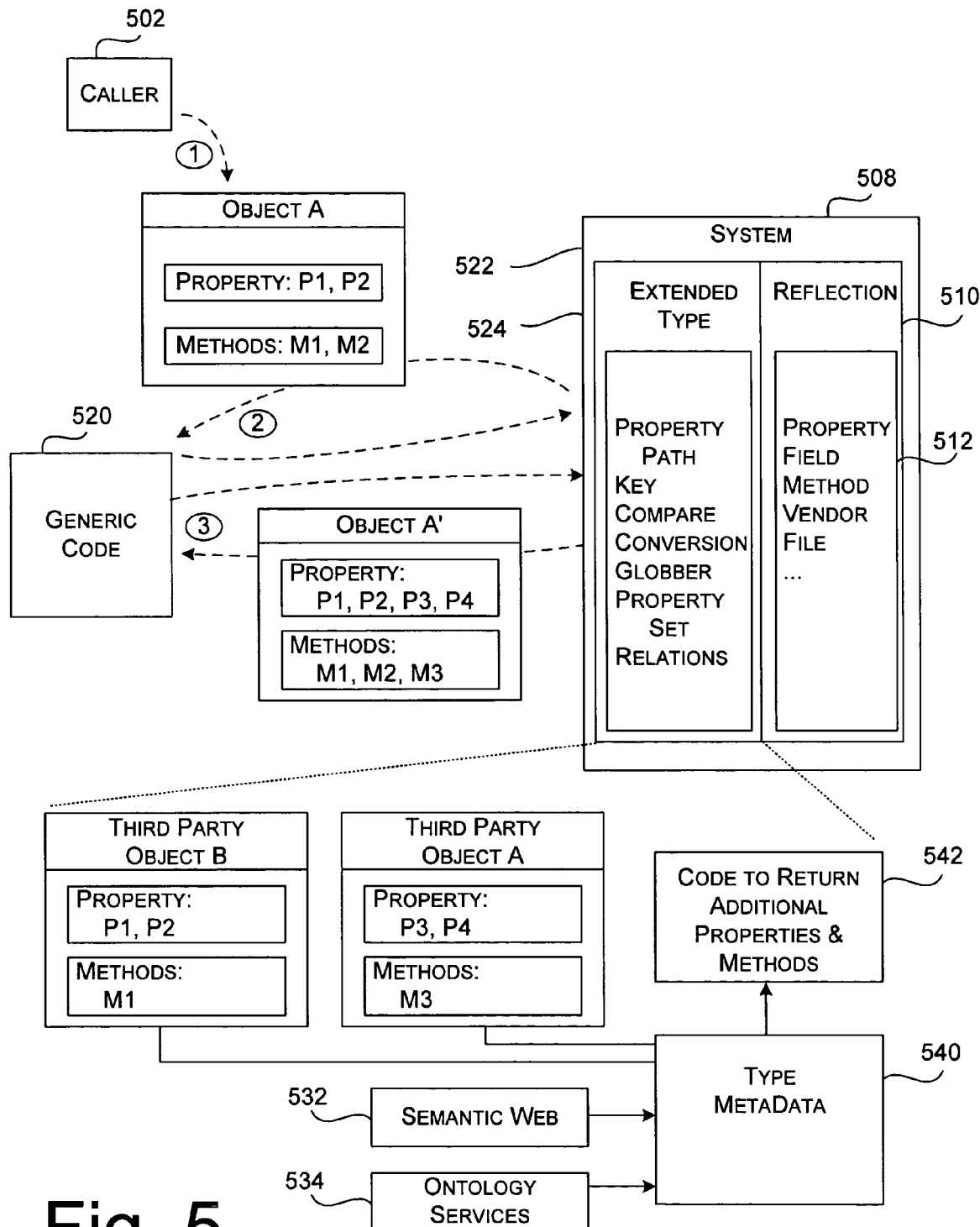
FIG. 5 is a functional block diagram of an exemplary extended type manager suitable for use within the administrative tool framework shown in FIG. 2.

FIG. 5 is a functional block diagram of an exemplary extended type manager for use within the administrative tool framework. For explanation purposes, the functionality (denoted by the number "3" within a circle) provided by the extended type manager is contrasted with the functionality provided by a traditional tightly bound system (denoted by the number "1" within a circle) and the functionality provided by a reflection system (denoted by the number "2" within a circle). In the traditional tightly bound system, a caller 502 within an application directly accesses the information (e.g., properties P1 and P2, methods M1 and M2) within object A. As mentioned above, the caller 502 must know, a priori, the properties (e.g., properties P1 and P2) and methods (e.g., methods M1 and M2) provided by object A at compile time. In the reflection system, generic code 520 (not dependent on any data type) queries a system 508 that performs reflection 510 on the requested object and returns the information (e.g., properties P1 and P2, methods M1 and M2) about the object (e.g., object A) to the generic code 520. Although not shown in object A, the returned information may include additional information, such as vendor, file, date, and the like. Thus, through reflection, the generic code 520 obtains at least the same information that the tightly bound system provides. The reflection system also allows the caller 502 to query the system and get additional information without any a priori knowledge of the parameters.

In both the tightly bound systems and the reflection systems, new data types can not be easily incorporated within the operating environment. For example, in a tightly bound system, once the operating environment is delivered, the operating environment can not incorporate new data types because it would have to be rebuilt in order to support them. Likewise, in reflection systems, the metadata for each object class is fixed. Thus, incorporating new data types is not usually done.

However, with the present extended type manager new data types can be incorporated into the operating system. With the extended type manager 522, generic code 520 may reflect on a requested object to obtain extended data types (e.g., object A') provided by various external sources, such as a third party objects (e.g., object A' and B), a semantic web 532, an ontology service 534, and the like. As shown, the third party object may extend an existing object (e.g., object A') or may create an entirely new object (e.g., object B).

Each of these external sources may register their unique structure within a type metadata 540 and may provide code 542. When an object is queried, the extended type manager reviews the type metadata 540 to determine whether the object has been registered. If the object is not registered within the type metadata 540, reflection is performed. Otherwise, extended reflection is performed. The code 542 returns the additional properties and methods associated with the type being reflected upon. For example, if the input type is XML, the code 542 may include a description file that describes the manner in which the XML is used to create the objects from the XML document. Thus, the type metadata 540 describes how the extended type manager 412 should query various types of precisely parse-able input (e.g., third party objects A' and B, semantic web 532) to obtain the desired properties for creating an object for that specific input type and the code 542 provides the instructions to obtain these desired properties. As a result, the extended type manager 412 provides a layer of indirection that allows "reflection" on all types of objects. An exemplary implementation for this layer of indirection is described in greater detail below in conjunction with remote processing. In this implementation, a precisely parse-able input (e.g., a serialized object) is used to obtain the desired properties for creating an object for a specific input type (e.g., a property bag). The property bag is then further de-composed to create objects of one or more base types. As will be described, the extended type manager enables one embodiment for transferring objects between remote processes and allows any object of any type to be transferred between the processes.

In addition to providing extended types, the extend type manager 412 provides additional query mechanisms, such as a property path mechanism, a key mechanism, a compare mechanism, a conversion mechanism, a globber mechanism, a property set mechanism, a relationship mechanism, and the like. Various techniques may be used to implement the semantics for the extended type manager. Three techniques are described below. However, those skilled in the art will appreciate that variations of these techniques may be used.

In one technique, a series of classes having static methods (e.g., getproperty( )) may be provided. An object is input into the static method (e.g., getproperty(object)), and the static method returns a set of results. In another technique, the operating environment envelopes the object with an adapter. Thus, no input is supplied. Each instance of the adapter has a getproperty method that acts upon the enveloped object and returns the properties for the enveloped object. The following is pseudo code illustrating this technique:

```
Class Adaptor
{
    Object X;
    getProperties( );
}.
```

In still another technique, an adaptor class subclasses the object. Traditionally, subclassing occurred before compilation. However, with certain operating environments, subclassing may occur dynamically. For these types of environments, the following is pseudo code illustrating this technique:

```
Class Adaptor : A
{
    getProperties( )
    {
        return data;
    }
}.
```

Thus, as illustrated in FIG. 5, the extended type manager allows developers to create a new data type, register the data type, and allow other applications and cmdlets to use the new data type. In contrast, in prior administrative environments, each data type had to be known at compile time so that a property or method associated with an object instantiated from that data type could be directly accessed. Therefore, adding new data types that were supported by the administrative environment was seldom done in the past.

Referring back to FIG. 2, in overview, the administrative tool framework 200 does not rely on the shell for coordinating the execution of commands input by users, but rather, splits the functionality into processing portions (e.g., host-independent components 206) and user interaction portions (e.g., via host cmdlets). In addition, the present administrative tool environment greatly simplifies the programming of administrative tools because the code required for parsing and data validation is no longer included within each command, but is rather provided by components (e.g., parser 220) within the administrative tool framework. The exemplary processing performed within the administrative tool framework is described below.

Exemplary Operation

FIG. 6 graphically illustrates an exemplary data structure used within the administrative tool environment. FIGS. 8-11 and 13 graphically illustrate exemplary processing flows within the administrative tool environment. One skilled in the art will appreciate that certain processing may be performed by a different component than the component described below without departing from the scope of the claims. Before describing the processing performed within the components of the administrative tool framework, an exemplary data structure for cmdlets used within the administrative tool framework is described.

Exemplary Data Structures for Cmdlet Objects

FIG. 6 is an exemplary data structure for specifying a cmdlet suitable for use within the administrative tool framework shown in FIG. 2. When completed, the cmdlet may be a management cmdlet, a non-management cmdlet, a host cmdlet, a provider cmdlet, or the like. The following discussion describes the creation of a cmdlet with respect to a system administrator's perspective (i.e., a provider cmdlet). However, each type of cmdlet is created in the same manner and operates in a similar manner. A cmdlet may be written in any language, such as C#. In addition, the cmdlet may be written using a scripting language or the like. When the administrative tool environment operates with the .NET Framework, the cmdlet may be a .NET object.

The provider cmdlet 600 (hereinafter, referred to as cmdlet 600) is a public class deriving from a cmdlet class 602. Cmdlet 600 includes a cmdlet class name specified in place of "<command name>". A software developer specifies a cmdletDeclaration 604 that associates a verb/noun pair 606, such as "get/process", "get/db", "format/table", and the like, with the cmdlet 600. The verb/noun pair 606 is registered within the administrative tool environment. The verb or the noun may be implicit. The parser looks in the cmdlet registry to identify the cmdlet 600 when a command string having the name (e.g., get/db) is supplied as input on a command line or in a script.

The cmdlet 600 is associated with a grammar mechanism that defines a grammar for expected input parameters to the cmdlet. The grammar mechanism may be directly or indirectly associated with the cmdlet. For example, cmdlet 600 illustrates a direct grammar association. In cmdlet 600, one or more public parameters (e.g., Name 630 and State 632) are declared. Each public parameter 630 and 632 may be associated with one or more types of attributes, such as input attribute 631 and 633. The input attributes 631 and 633 specify the manner in which public parameters 630 and 632, respectively, are populated. For example, the public parameter may be populated from an object emitted by another cmdlet in a pipeline of commands, from the command line, and the like. If the public parameters are populated from other objects, cmdlet 600 includes a first method 640 (e.g., Start-Processing) and a second method 642 (e.g., processRecord).

The core engine uses the first and second methods 640 and 642 to direct the processing of the cmdlet 600. For example, the first method 640 may be executed once and may perform set-up functions. The code within the second method 642 may be executed for each object (e.g., record) that needs to be processed by the cmdlet 600. The cmdlet 600 may also include a third method (not shown) that cleans up after the cmdlet 600. Alternatively, the grammar mechanism may be indirectly associated with the cmdlet by using a description of the public parameters defined in an external source, such as an XML document. The description of the parameters in this external source would then drive the parsing of the input objects to the cmdlet.

Thus, as shown in FIG. 6, code within the second method 642 is typically quite brief and does not contain functionality required in traditional administrative tool environments, such as parsing code, data validation code, and the like. Thus, system administrators can develop complex administrative tasks without learning a complex programming language.

The data structure 600 may also include a private member 650 that is not recognized as an input parameter. The private member 650 may be used for storing data that is generated within the cmdlet.

Exemplary process flows within the administrative tool environment are now described.

Exemplary Remote Processing of a Cmdlet

FIG. 7 is a functional block diagram generally illustrating a remote computing environment 700 that utilizes the mechanisms described in conjunction with the present invention. Illustrated is an "administrator" 710 computing system and a remote computing system (hereinafter referred to as remote server 720). The remote server 720 may be physically located anywhere and may be an individual computing system in use by an end user, such as an employee or subscriber. While FIG. 7 illustrates a single remote server 720, the remote computing environment 700 may include any number of remote servers. Each remote server performs processing as described below with reference to remote server 720.

The administrator 112 and remote server 720 may be computing devices, such as computing device 100 illustrated in FIG. 1. The administrator 112 is used by a system administrator or the like to maintain the remote server 720. In other words, the administrator 112 runs commands and performs tasks that may query the status or state of the remote server 720 and/or make changes to the remote server 720. The administrator 112 includes an execution environment, which may include several components of the administrative tool framework 200 shown in FIG. 2. In particular, administrator 112 includes a remote interface 714 and a list of base types 712. In one embodiment, the list of base types 712 comprises a table having two columns: a first column for listing a type of object and a second column for referencing a specific serializer associated with the type. While other components within the administrative tool framework 200 may also be utilized to perform remote processing of cmdlets, the following discussion focuses on the interaction between the administrator 112 and the remote server 720 in order to process a remote cmdlet, such as "Rcmd machine:RemoteServer Get/DB", and describes the operation of the other components, as needed, within this context. In addition, the following example illustrates remote processing of one cmdlet. However, the remote aspects work equally as well if there is a pipeline of cmdlets.

Remote server 720 includes a remote agent 724. The remote agent 724 is a component that responds to remote requests to execute one or more cmdlets. In addition, remote agent 724 is configured to take the results of the execution of the one or more cmdlets and create a return package 730 that is returned to the requesting entity (e.g., administrator 112). In one implementation, the package takes the form of a serialized object that includes the results of execution, as well as meta information such as the date and time of invocation, identifying information about the particular remote system from which the results originated, and information about the requesting entity. This and perhaps other information is bound up into the return package 730 and transmitted back to the requesting entity (e.g., administrator 112).

It is important to note, that the requesting entity may be one process 11 executing on a computing system and the remote server may be another process operating on the same computing system. In this configuration, the communication interface 740 includes system level application programming interfaces (API) for communicating between two processes, which are well known to those skilled in the art. In other embodiments, the communication interface 740 includes an internet or intranet network.

Figure 8:
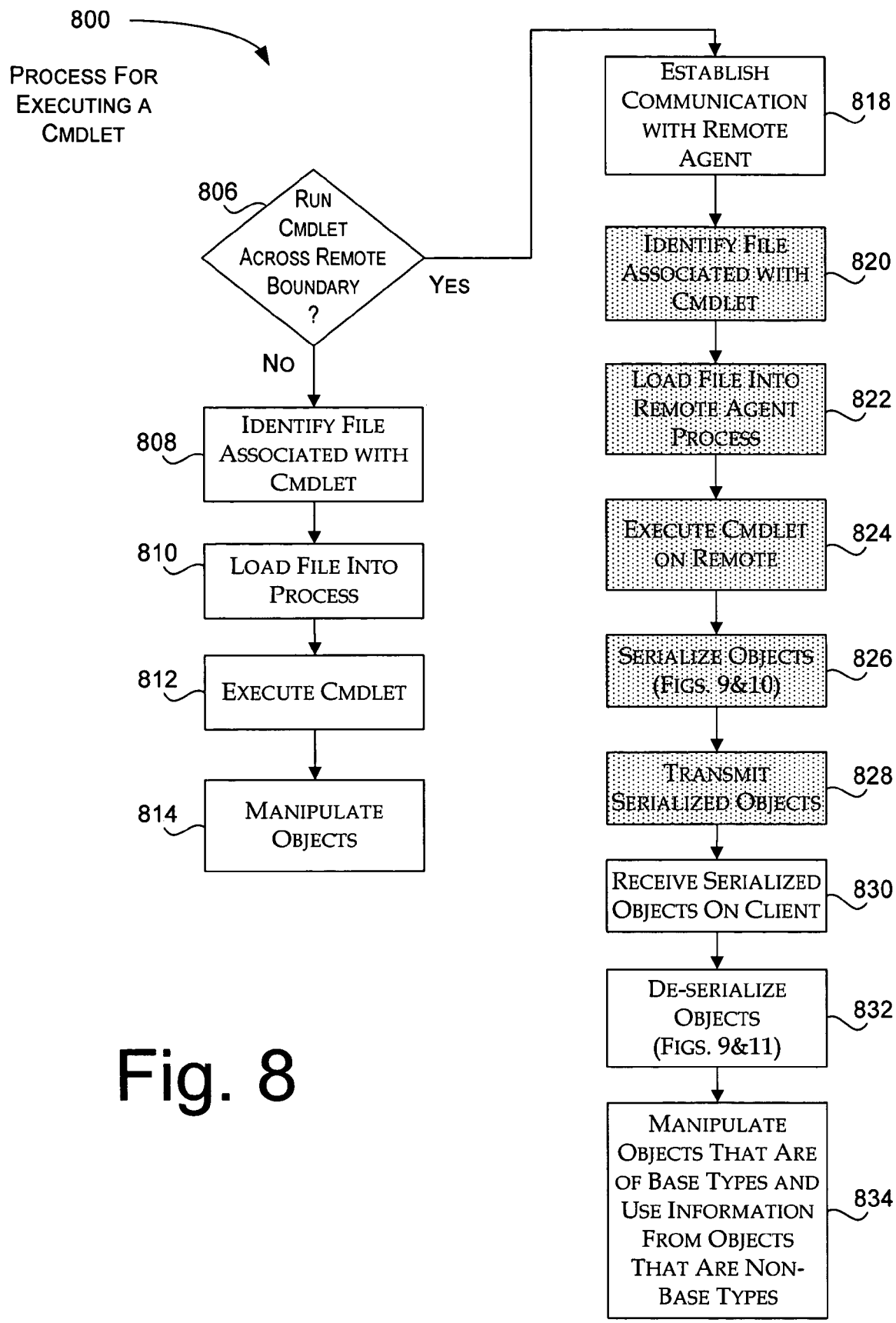
FIG. 8 is a logical flow diagram illustrating an exemplary process for processing a cmdlet.

FIG. 8 is a logical flow diagram generally illustrating steps that may be performed by a process 800 for executing a cmdlet. The process begins at decision block 806, where a cmdlet has been input for execution, such as through the command line or the like. For example, the cmdlet, "Rcmd machine:RemoteServer Get/DB", may have been entered. At decision block 806, a location where the cmdlet is to be executed is determined in order to determine whether the execution crosses a remote boundary. In overview, each computing system (e.g., administrator 720, remote server 720) supports one or more processes. Each process hosts at least one program or application. In addition, one process may host one or more application domains. Application domains are a relatively new mechanism that allows multiple applications to execute within the same process, yet still be isolated from other applications. The application domain is a logical and physical boundary created around an application by a runtime environment. Each application domain prevents the configuration, security, or stability of its respective application from affecting other applications in other application domains. Thus, the cmdlet may be executed in the following locations: 1) within the application domain of the requesting entity (e.g., administrator); 2) within another application domain of the same process as the requesting entity; 3) within another process on the requesting entity; or 4) on a remote server. If the cmdlet executes either within another process (#3) or on a remote server (#4), the following discussion refers to this as executing over a "remote boundary", which generally means executing outside a process boundary.

For specifying the location, in one embodiment, a parameter specified along with the cmdlet identifies which location to execute the cmdlet. For example, the parameter "-node" along with a relevant node name may indicate execution of the cmdlet on a remote server associated with the node name. The parameter "-workerprocess" may indicate execution of the cmdlet in another process of the requesting entity. The parameter "-appdomain" may indicate execution of the cmdlet within another application domain of the same process. If execution is to occur within the same application domain or within another application domain within the same process, processing continues at block 808. Otherwise processing continues at block 818. While the processing of blocks 808-814 is not essential to the understanding of remote processing, understanding this processing will aid in understanding the concerns that were overcome in order to support remote processing of cmdlets.

At block 808, a file associated with the cmdlet is identified. The identification of the cmdlet and its associated file may be thru registration. As described above in conjunction with FIG. 6, the file contains the code for executing the cmdlet and also contains the properties and methods associated with the cmdlet class.

At block 810, the file is loaded into the process for the current application domain. As mentioned above, this blind loading of an executable file into the process on the requesting entity poses a security risk if the file is being loaded from some unknown, untrusted, remote server. As will be described in conjunction with blocks 820-834, this security risk is overcome by utilizing the present method for transferring objects between remote boundaries.

At block 812, the cmdlet is executed. Execution includes instantiating the cmdlet class to create a cmdlet object. Populating the properties specified in the cmdlet object in the manner specified in the cmdlet class. Creating objects as defined in the code of the cmdlet class. If the incoming objects (such as objects from a previous cmdlet in a pipelined command) do not match the type specified in the current cmdlet class, the extended type manager may coerce the type as needed. Processing continues at block 814.

At block 814, the process may manipulate the created objects by accessing any of the properties and by invoking any of the methods. These created objects are referred to as "live" or "raw" objects because the object's methods are available and can be invoked.

As one can imagine, the processing described in blocks 808-814 is less than ideal when the cmdlet is located on a remote computer. If the remote file was loaded into the local process for execution, there is a chance that the remote file could execute malicious code, which may compromise the security of the requesting entity. In addition, in an administrative tool environment, the requesting entity (e.g., administrator) is generally interested in obtaining administrative information regarding the remote computer. Thus, the objects populated by the cmdlet must contain status or other information pertinent about the remote server and not the requesting entity (e.g., administrator).

As explained in the background section, in a traditional web service environment, the client is responsible for knowing and trusting the remote server to whom it wishes to communicate. However, as explained above, this greatly restricts to whom the client may communicate because only objects that support a specific interface may communicate with the requesting entity. The present method for communicating objects between a requesting entity (e.g., administrator) and a remote server does not impose these limitations and is now described. For convenience, blocks which perform processing on the remote entity (e.g., remote server or separate process) are illustrated with a "dotted" background.

Returning to decision block 806, if the cmdlet is to be run in another process or on a remote server, processing continues at block 818. At block 818, the client establishes communication with a remote agent associated with the remote entity. The remote agent then performs blocks 820-824, which performs the functioning described above for blocks 810-812, but instead performs them with respect to the remote entity. However, once the cmdlet is executed and has obtained its associated objects, processing continues at block 826.

At block 826, the objects are serialized in a manner such that the security of the requesting entity (e.g., administrator) is not compromised. The serialization process creates a return package, such as return package 730 illustrated in FIG. 7. In overview, serializing the objects serializes information in a manner that can not be harmful to the requesting entity. An overview of the serialization process is illustrated in FIG. 9 and a more detailed description of the serialization process is described below in conjunction with FIG. 10. Processing continues at block 828.

At block 828, the serialized objects are transmitted to the client computer. The transmission of the serialized objects may be performed using convention methods known for network communication or may use known inter-process communication if the requesting entity and the remote server are on the same computer. Processing continues at block 830.

At block 830, the serialized objects are received at the requesting entity. The serialized object type is a type registered in the extended type manager. Thus, upon receipt, the extended type manager recognizes the serialized object type. Processing continues at block 832.

At block 832, the serialized object is de-serialized into sub-component objects. Briefly, the de-serialization process decomposes the serialized object into known base types. For any property that is not a base type, the de-serialization keeps the property as a property bag. An overview of the de-serialization process is illustrated in FIG. 9 and a more detailed description of the de-serialization process is described below in conjunction with FIG. 11. Processing continues at block 834.

At block 834, the de-serialized objects that were one of the base types may be manipulated as "raw" objects, meaning that the methods and properties associated with the object are available. De-serialized objects that are not one of the base types may not be manipulated as "raw" objects. These objects are referred to as "deserialized" objects, which mean that the objects contain information about certain properties for the object, but their methods are not available.

Figure 13:
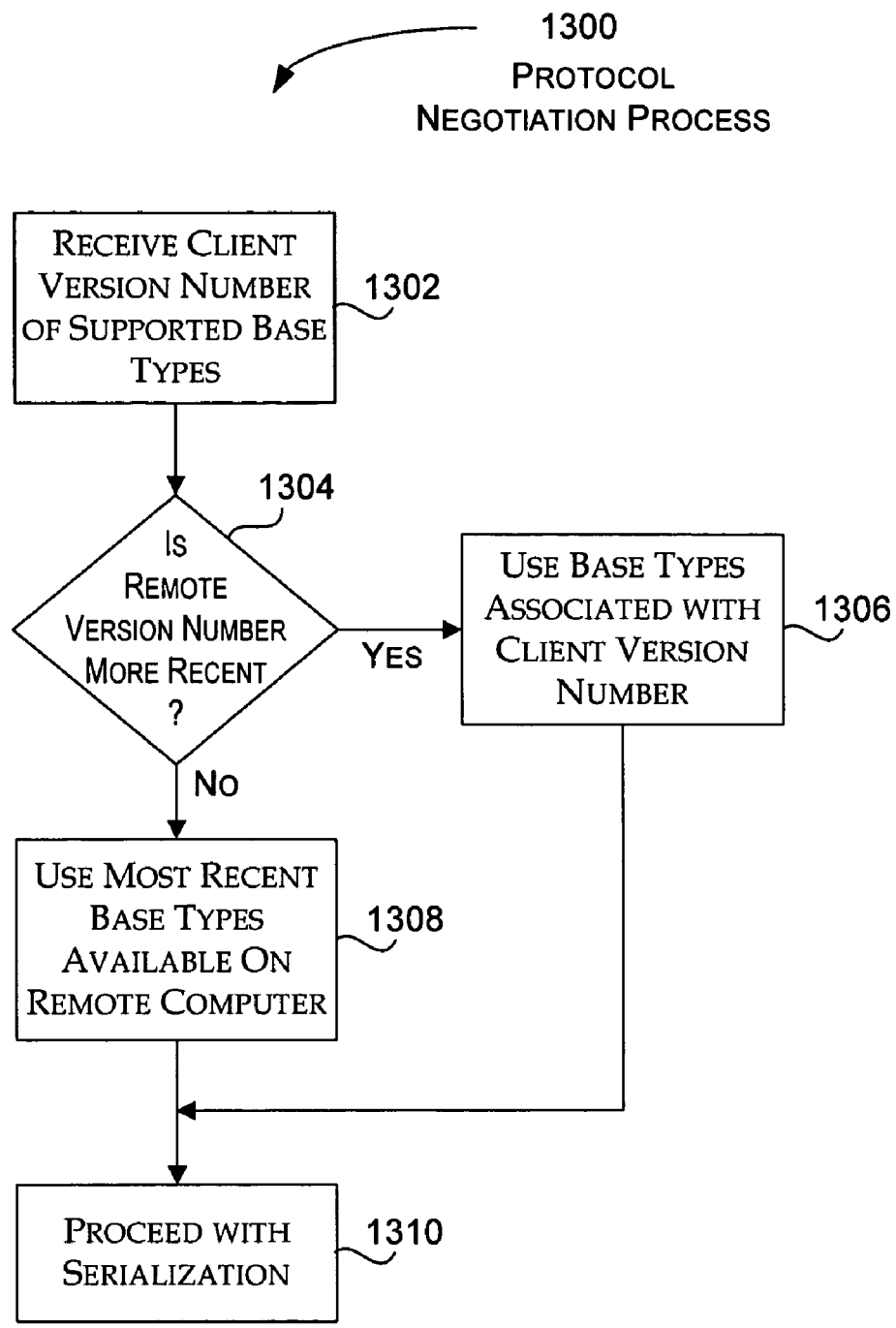
FIG. 13 is a logical flow diagram illustrating an exemplary process for negotiating a protocol suitable for use in conjunction with the process for serializing objects shown in FIG. 10.

FIG. 9 is a block diagram illustrating a general overview of the serialization process and de-serialization process suitable for use in FIG. 8. In general, the serialization process 900 converts an object 902 that was created by a cmdlet executing on the remote entity into a hierarchical tree 904. In general, the hierarchical tree 904 is an object that represents object 902 broken down into sub-components. Some of the sub-components are object types known by both entities (e.g., the requesting entity and the remote entity). These known types are identified in the list of base types 712 and 722 on the requesting entity and remote entity, respectively (see FIG. 7). When base types 712 and 722 do not contain the same list of base types, a protocol negotiation process, described in detail below in conjunction with FIG. 13, is performed to determine which list of base types is used. Thus, as will be explained in greater detail below in conjunction with FIG. 10, each entry within the hierarchical tree is serialized and added to the serialized object 906. In one embodiment, the serialized object 906 comprises an XML document. This serialized object, along with other information, is combined to form the request package that is transmitted to the requesting entity.

Upon receiving the request package, the requesting entity retrieves the serialized object 906 and performs a de-serialization process 910. In general, the de-serialization process 910 reconstructs the hierarchical tree 904. Because the hierarchical tree 904 is one of the object types recognized by the extended type manager, the extended type manager de-composes the hierarchical tree 904 into base objects and/or property bag objects 912. The base objects are "live" (i.e., "raw") objects that have functionality (e.g., methods). The property bag objects 912 (i.e., "de-serialized" objects) provide relevant data, but do not include methods. Thus, as this overview illustrates, the object 902 originally created on the remote entity has been transferred to the requesting entity as a plurality of "raw" base objects and other "de-serialized" objects without compromising the security of the requesting entity or requiring any special interface for the object 902. This deserialization process 910 is described in more detail in conjunction with FIG. 11.

Figure 10:
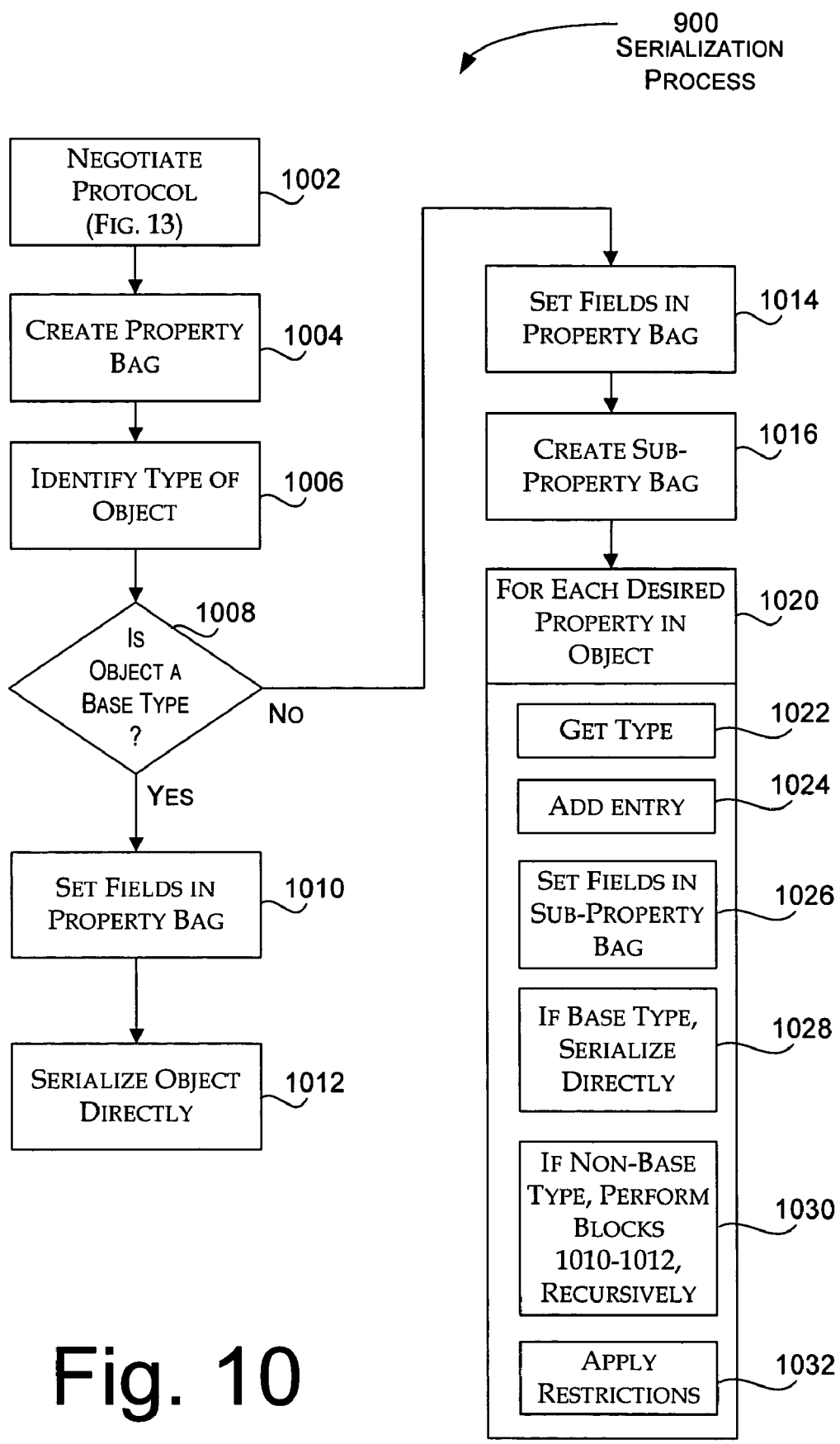
FIG. 10 is a logical flow diagram illustrating an exemplary process for serializing objects suitable for use in the processing of the cmdlet shown in FIG. 8.

FIG. 10 illustrates an exemplary process 900 for serializing objects. As described above, as a general overview, the serialization process 900 decomposes an object and its properties (properties are also objects) into known base types and possibly into one or more property bags. The process 900 is recursive in nature and continues until the objects (including properties) have either been decomposed into one of the base types, or until each of the remaining objects is not listed in the known base types. Because the serialization process 900 is recursive and may create a hierarchical tree that is difficult to manage, process 900 may also be limited using several different techniques that will be described below. In order to better explain process 900, the following discussion uses an example object (e.g., SQLInfo object) hypothetically created by the "get/DB" cmdlet. In general, the SQLInfo object may be defined in any conventional manner. The following is one of those conventional manners:

```
SQLInfo
{
    public int EmployeeNumber
    [Attribute("Identification")]
    public string Name;
    public residence Address;
    public int SSN;
    public DateTime BirthDate;
}
```

FIG. 12 illustrates a graphical representation of a portion of a hierarchical tree that is created during process 900. The hierarchical tree 8 represents a decomposed portion of the SQLInfo object shown above and will be used in conjunction with FIG. 9 to describe the serialization process.

Process 900 begins at block 1002, where an object created by a remote cmdlet has been created. At block 1002, a protocol negotiation process is performed in order to identify the level at which the requesting entity and the remote entity may communicate. Briefly, described in detail later in conjunction with FIG. 13, the level at which the entities communicate determines the amount of information that is transmitted to the requesting entity in order to transfer the object. As will be explained, the protocol negotiation process allows both the requesting entity and the remote entity to upgrade their system independent of each other while still allowing them to communicate with each other using different versions. In practice, this allows a requesting entity, which is operating with a version of base types that is several years newer than the version on the remote entity, the ability to still communicate with the remote entity. The converse is also true. Therefore, systems that have been shipped many years ago can be managed by newer administrator computers. The output of the negotiation process is a negotiated list that identifies each of the negotiated base types. Once the level of communication is determined, processing continues at block 1004.

At block 1004, a property bag is created for holding information about the object. In one embodiment, the property bag may be implemented as a hash table. The property bag is a core data type supported by the administrative tool environment. Processing continues at block 1006.

At block 1006, the type of object is identified by reflecting on the object. Once the type is identified, processing continues at decision block 1008. At decision block 1008, a determination is made whether the negotiated base types include the identified type of object. This determination may be implemented as a look-up within the negotiated list. For this implementation, the negotiated list would identify each of the negotiated base types. If the object is identified as one of the negotiated base types, processing continues at block 1010.

At block 1010, an entry is created in the property bag for the identified object. An exemplary implementation of a property bag will now be described.

Turning briefly to FIG. 12, a graphical depiction of a portion of an exemplary hierarchical tree (e.g., property bag tree) is illustrated. The portion depicts two levels within the hierarchical tree: the first level having property bag 1220; a second level having sub-property bag 1240. Each property bag 1220 and 1240 includes a name field 1202, a value field 1204, and a type field 1206. In addition, each property bag 1220 and 1240 may include an IsType field 1208, a WasType field 1210, and a TreatAs field 1212. Property bag 1220 includes entries 1222-1230 and sub-property bag 1240 includes entries 1242-1248.

Returning to FIG. 10, as mentioned above for block 1010, an entry for the object is created in property bag 1220 (e.g., entry 1222). Each field for the entry is then updated with information relating to the object. For example, the name for the object (e.g., "EmployeeName") is entered in the name field 1202. A value (e.g., 28731) for the property is entered in the value field 1204. The type of the object (e.g., "Int") is entered in the type field 1206. In one embodiment, the name field may be a key for the hash table. Processing continues at block 1012.

At block 1012, the object is serialized. Direct serialization may occur via mechanisms provided by the underlying component framework, or by code that is specified for the base type, or the like. The serialization process for the object depends on its base type. Each base type has its own special serialization process. In one embodiment, the special serialization process is identified within the negotiated list. For this embodiment, the negotiated list includes a reference to a special serialization process for each of the negotiated base types in the list. In one embodiment, direct serialization converts the object into XML. However, direct serialization may convert the object into formats other than XML without departing from the appended claims. The result of the special serialization process is stored within the serialized object.

Returning to decision block 1008, if it is determined that the object is not identified as one of the negotiated base types, processing continues at block 1014. At block 1014, a property bag type is entered in the type field 1206. This property bag type then references a sub-property bag (e.g., sub-property bag 1240) created in block 1016.

At block 1016, a sub-property bag (e.g., sub-property bag 1240) is created. Thus, by creating additional levels of sub-property bags, a property bag tree is formed. The sub-property bag has the same fields as defined for the property bag. This sub-property bag may also have an entry for one or more sub-property bags creating another level in the hierarchical tree of property bags. Processing continues at block 1020.

At block 1020, the recursive nature of the serialization process is graphically depicted. The serialization process focuses on serializing each desired property within the object. Typically, the desired properties are properties that are designated as public. However, in some cases, hidden properties and other properties may be desired properties, and, are also serialized. Blocks 1022-1032 may be performed in various orders and in some cases one or more of the blocks (e.g., block 1032) may be optionally performed. Each of the blocks 1022-1032 is now further described.

At block 1022, a type for the desired property is identified. This again occurs via reflection as explained above in reference to block 1006.

At block 1024, an entry into the current property bag (e.g., a sub-property bag) is added for the property.

At block 1026, the fields in the entry associated with the desired property are set. The fields are set as explained above for block 1010, but are set in the sub-property bag, rather than the property-bag. For example, the fields for entry 1242 in sub-property bag 1240, shown in FIG. 12, are updated with information associated with the property (object).

At block 1028, if the desired property is one of the negotiated base types, the property is directly serialized as described above for block 1012.

At block 1030, if the desired property is not one of the negotiated base types, blocks 1014 and 1020 are performed in a recursive fashion.

Due to this recursive process, the hierarchical tree of property bags may become difficult to manage. Thus, it may be desirable to limit the serialization process 900. Embodiments for limiting the serialization process are represented within block 1032, and may optionally be performed. There are several embodiments for culling the hierarchical tree. In one embodiment, a policy may be set that specifies a predetermined depth of the hierarchical tree. For example, if the predetermined depth is set at two, the recursive nature of the serialization process stops after creating one or more sub-property bags referenced from the property bag. The serialization process 900 does not proceed any further with decomposing the objects within the sub-property bags. Thus, these sub-property bags are serialized as a property bag and are included within the serialized object.

In another embodiment, prior to serialization, the remote agent runs the object through a "pick" process that strips out the properties that were not specified. An exemplary syntax is as follows: >Rcmd machine:RemoteServer Get/DB | Pick Name, Birthdate. Then, during serialization, the specified properties (e.g., Name and Birthdate) become the desired properties and are serialized as described above. The pick process may be another cmdlet that is available on every system. One disadvantage of explicitly specifying the properties with the pick process is that the pick list must be specified each time and that the desired properties must be known in order to pick them.

In still another embodiment, block 832 may use a property set mechanism. The property set mechanism allows a name to be defined for a set of properties. An administrator may then specify the property set name, along with the cmdlet, in order to obtain the desired set of properties. The property set may be defined in various ways. In one way, a predetermined parameter, such as "?", may be entered as an input parameter for a cmdlet. The operating environment upon recognizing the predefined parameter may list all the properties of the object. The list may be a GUI that allows an administrator to check (e.g., "click on") the desired properties and name the property set. The property set information is then stored in the extended metadata. For example, a property set may be named "performance". Each object would then identify which of its properties should be included in this performance property set. Therefore, the administrator does not need to know the name of the properties, but rather only needs to know the name of the desired property set. A property set named "default" may be defined that specifies the desired properties to serialize for an object. The administrator could then specify the default property when serialization is necessary.

Another way of limiting the property bag hierarchical tree is by only supporting certain types and forcing types derived from the certain types to conform to that type. In one implementation, the object hierarchy is "walked down" by reflecting on each object to identify its parent. For certain objects, if it derived from a base type, the object will be forced to be its parent type. For example, a hash table object is an Idictionary object, which is an IEnumberable object, which derives from a base object. The serialization process may treat the hash table object as an IEnumberable object. In this way, the serialization process completely supports objects at certain levels within the object hierarchy, but forces objects of other types within the object hierarchy to conform to the chosen type. In practice, even though the original object type is not transferred, once the information is obtained at the receiving computer, the receiving computer can perform processing on it (such as creating a key) to obtain the original object, if needed.

Once the serialization process 900 is completed, the serialized object, along with other information, is combined to form the request package that is transmitted to the requesting entity.

The property bag and sub-property bags may have additional fields that are set during the serialization process, such as the IsType filed 1208, the WasType field 1210, or the TreatAs field 1212. These types are used during the de-serialization process 910. The IsType field 1208 identifies a type for the object. However, when the object is serialized, the IsType field 1208 for the object becomes "NULL". The WasType field 1210 identifies the type the property was before changing. From this information, the de-serialization process 910 can identify where the object originated, but can not know how many properties the object currently has. For example, if a property set or pick process was used when serializing the object, only specific properties were serialized, not all. The TreatAs field 1210 identifies a type and guarantees that the properties associated with that type are available. For example, using the property set example above, one could define a new object type as "SQLInfoPersonal". This new type guarantees that specified properties associated with the object are available, such as home address, home phone number, and the like. If sufficient properties are specified to include all the properties needed to qualify as a TreatAs, the serialization process 900 will enter the correct type under the TreatAs field 1210.

Figure 11:
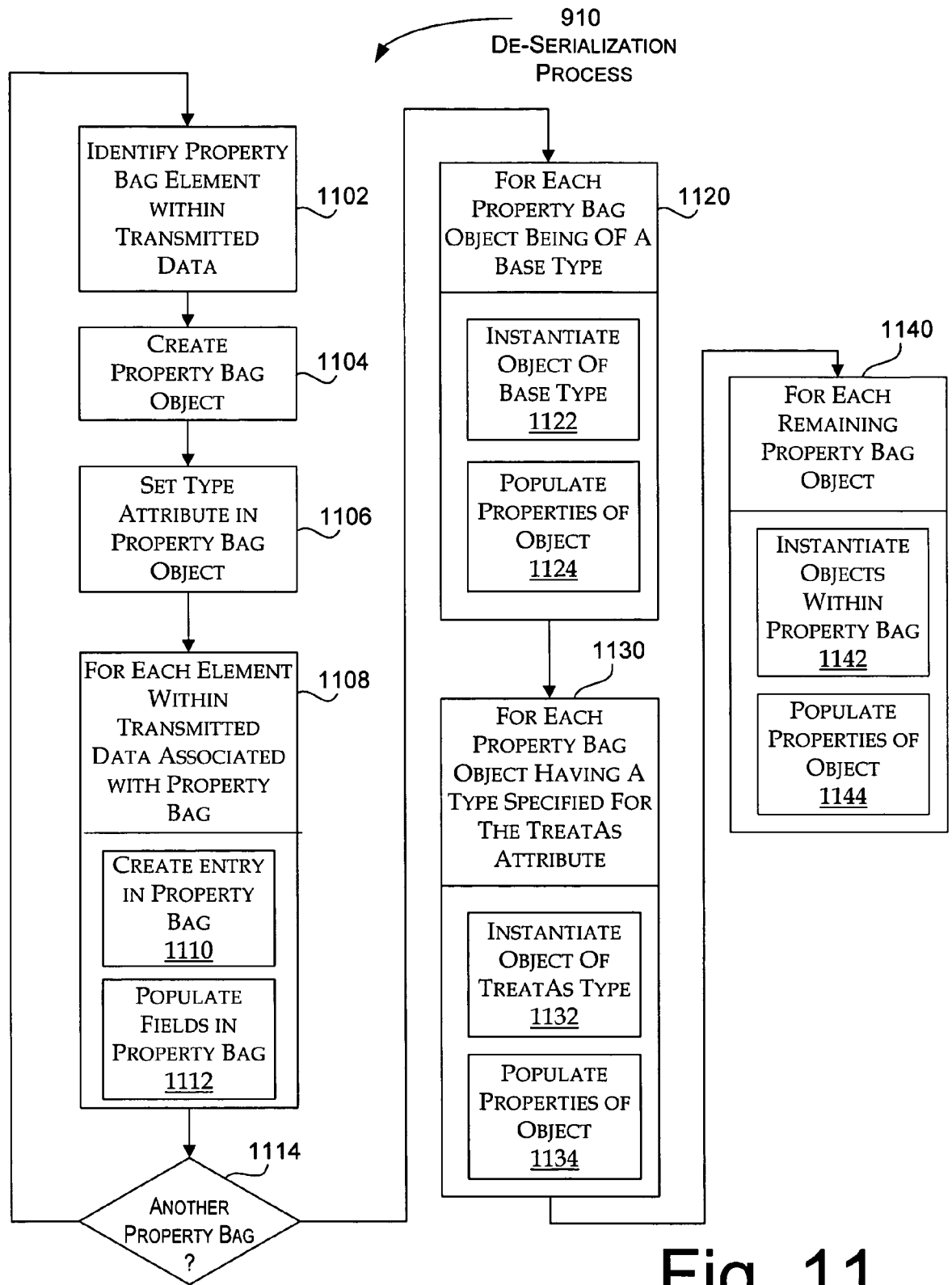
FIG. 11 is a logical flow diagram illustrating an exemplary process for de-serializing objects suitable for use in the processing of the cmdlet shown in FIG. 8.

FIG. 11 is a logical flow diagram illustrating an exemplary process for de-serializing objects suitable for use in the processing of the cmdlet shown in FIG. 8. In general, de-serializing the transmitted objects performs the converse operations as the serialization process. Processing begin at block 1102, where a property bag indicator is identified within the transmitted data. In one embodiment, the indicator may be an element within an XML document. Processing continues at block 1104.

At block 1104, a property bag object is created that will be populated with information contained within the transmitted data.

At block 1106, a type property for the property bag object is set. The type property informs the extended type manager so that the extended type manager can handle the property bag as needed.

At block 1108, each element identified within the transmitted data and associated with the property bag is processed. At block 1110, an entry within the property bag is created. At block 1112, the fields within the property bag are populated. Processing continues at decision block 1114.

At decision block 1114, a determination is made whether another property bag is defined within the transmitted data. If there is another property bag defined within the transmitted data, processing loops back through blocks 1102-1108 until the transmitted data does not contain any more property bags.

However, once there is no more property bags, processing continue at blocks 1120-1140. Once the hierarchical tree of property bags has been created, each property bag is reviewed for further processing.

At block 1120, if the type property for the property bag is one of the base types, the de-serialization process instantiates an object of the identified type (block 1122) and populates the properties of the object (block 1124).

At block 1130, if the TreatAs attribute for the property bag specifies a type, an object of the specified type is instantiated (block 1132) and properties of the object are populated (1134). The type specified in the TreatAs attribute is one of the base types.

At block 1140, for each remaining property bag that is not of a base type, each object identified within the property bag is instantiated (block 1142) and populated (block 1144).

Thus, as one can see, if the original object created at the remote computer is a base type, the transmitted data includes minimal information. This corresponds with a hierarchical tree with only one level. The transmitted data would include the name/value pairs for the properties but would not contain any executable code. However, once the requesting computer received the transmitted data and recognized the type, an object of that type would be instantiated and would have the methods and functionality provided by the original object. In this manner, malicious code is not transmitted to and executed by the requesting computer. Instead, non-harmful information about the object is transmitted to the requesting computer.

FIG. 13 is a logical flow diagram illustrating an exemplary process for negotiating a protocol suitable for use in conjunction with the process for serializing objects shown in FIG. 9. Even with limiting the specific parameters to serialize or specifying a depth for the hierarchical tree, for certain objects, the amount of information that is transferred between the two computers is quite large. Thus, an additional negotiation mechanism is provided that limits the amount of information that is necessary for transmission. As described above, the complexity of the hierarchical tree depends on the number of negotiated base types. When a large number of negotiated base types are known, the hierarchical tree becomes less complex, which ultimately results in less information transmitted to the requesting computer. For any of the entries within the property bag specifying a base type, only minimal information is transferred in order to create a "raw" object on the requesting computer. Thus, it is envisioned that the number of base types specified within the list of base types may grow in order to accommodate more and more objects. However, the present method still does not place artificial restrictions or requirements on software developers in order to use this method. For example, in some prior environments, both computers had to be updated with the same version in order to operate properly. In this prior environment, one computer dictated which computers could communicate with it and forced compliance on the other computers in order for communication to occur. In contrast, the present method of transferring objects provides a protocol negotiation method that allows computers to update independently of each other and still be able to communicate with each other.

The protocol negotiation process 1300 begins at block 1302. At block 1302, a client version number is received. The client version number identifies the most recent version of the list of base types that the client (e.g., requesting computer) may use. Processing continues at decision block 1304.

At decision block 1304, the client version number is compared with the remote version number to determine whether the remote version number is more recent. The remote version number identifies the most recent version of the list of base types that the remote server may use. If the remote version number is more recent, processing continues at block 1306.

At block 1306, the list of base types associated with the client version number is used for the serialization process. Thus, the client version becomes the negotiated list that is used during the serialization process.

On the other hand, if the remote version number is not as recent as the client version, processing continues at block 1308. At block 1308, the most recent list of base types available on the remote computer is used for the serialization process. Thus, the remote version becomes the negotiated list that is used during the serialization process.

In another embodiment of the negotiation process, the requesting computer may send the base types that it supports to the remote computer. The remote computer may then walk through the table and decide which types are supported by accepting or rejecting items in the table. The types that are accepted then form the negotiated list.

In another embodiment of the negotiation process, the requesting computer may send a set of references. The set of references may specify a file name. Thus, any type of object within the specified file name would be supported and be one of the negotiated base types.

Although details of specific implementations and embodiments are described above, such details are intended to satisfy statutory disclosure obligations rather than to limit the scope of the following claims. Thus, the system and method described above is defined by the claims is not limited to the specific features described above. Rather, the present system and method is claimed in any of its forms or modifications that fall within the proper scope of the appended claims, appropriately interpreted in accordance with the doctrine of equivalents.

The invention claimed is:

1. At least one computer-readable storage medium having computer executable instructions that provide a method for transferring a computer-readable object across a remote boundary, the method comprising:

negotiating with a remote entity to determine a negotiated list of known objects, the negotiating comprising:
comparing a version of a first list of object types available to the remote entity with a version of a second list of object types available to a client that intends to transmit a computer-readable object to the remote entity;
in an event that the version of the second list of object types is more recent than the version of the first list of object types, selecting the first list of object types to be the negotiated list of known objects; and
in an event that the version of the first list of object types is more recent than the version of the second list of object types, selecting the second list of object types to be the negotiated list of known objects;
decomposing the computer-readable object into multiple sub-components, including dividing the multiple sub-components into a hierarchy;
creating a property bag in the hierarchy for holding information of the computer-readable object;
in an event that a first sub-component of the multiple sub-components is included in the negotiated list of known objects, directly serializing the first sub-component without including any executable code of the first sub-component;

in an event that a second sub-component of the multiple sub-components is not included in the negotiated list of known objects, creating a sub-property bag within the property bag for the second sub-component to form a hierarchical tree of property bags and recursively serializing properties of the second sub-component, wherein the hierarchical tree of property bags is limited by at least one of:
  specifying a maximum depth of the hierarchical tree of property bags,
  supporting only certain object types and forcing object types that are derived from the certain object types to conform to respective types;
serializing the multiple sub-components and the property bag into a serialized package; and
transmitting the serialized package to the remote entity.

2. The computer-readable storage medium of claim 1, wherein the negotiated list identifies a data type of the computer-readable object or at least one sub-component of the multiple sub-components as one of the known object types.

3. The computer-readable storage medium of claim 1, wherein at least one sub-component comprises an unknown object having a type unidentified within the negotiated list.

4. The computer-readable storage medium of claim 3, wherein decomposing the computer-readable object further comprises decomposing the unknown object into another level of sub-components based on the negotiated list.

5. The computer-readable storage medium of claim 1, wherein a first process on a system transmits the serialized package and the remote entity comprises another process on the system.

6. The computer-readable storage medium of claim 1, wherein a first process on a system transmits the serialized package and the remote entity comprises another process on another system.

7. The computer-readable storage medium of claim 1, wherein a first application domain executing within a process transmits the serialized package and the remote entity comprises another application domain within the process.

8. The computer-readable storage medium of claim 1, wherein the property bag comprises a hash table.

9. The computer-readable storage medium of claim 8, wherein a key for each entry in the hash table comprises a name for the sub-component associated with the entry.

10. The computer-readable storage medium of claim 1, wherein the property bag comprises a plurality of entries, each entry being associated with one of the multiple sub-components and having a first field for storing a name associated with the one of the multiple sub-components, a second field for storing a value associated with the one of the multiple sub-components, and a third field for storing a type associated with the one of the multiple sub-components.

11. The computer-readable storage medium of claim 1, wherein the negotiating further includes accepting a plurality of object types received from the client, the accepted object types becoming known object types identified within the negotiated list.

12. The computer-readable storage medium of claim 1, wherein the negotiating further includes receiving an identifier for a file having the negotiated list, including object types identified within the file.

13. The computer-readable storage medium of claim 1, further comprising limiting the hierarchy of sub-components by specifying a pre-determined depth for the hierarchy, wherein decomposing the object comprises decomposing the object to the pre-determined depth.

14. The computer-readable storage medium of claim 1, further comprising limiting the hierarchy of sub-components by defining a property set that identifies individual properties of the object, wherein decomposing the object comprises decomposing the identified individual properties of the object.

15. The computer-readable storage medium of claim 1, further comprising limiting the hierarchy of sub-components by identifying a specified property within the object, wherein decomposing the object comprises decomposing the specified property.

16. The computer-readable storage medium of claim 1, further comprising limiting the hierarchy of sub-components by specifying a pre-determined number that limits the known objects that are serialized into the serialized package by the number.

17. The computer-readable storage medium of claim 1, wherein just the known objects are serialized in the serializing act.

18. At least one computer-readable storage medium having computer executable instructions that provide a method for receiving a package representing a computer-readable object transmitted across a remote boundary, the method comprising:
  receiving a serialized package from a remote entity;
  identifying a hierarchy of sub-components, the hierarchy representing an object of a first type;
  for each sub-component:
    identifying a type associated with the sub-component;
    determining whether the identified type is within a list of known object types, wherein the list of known object types has been negotiated with the remote entity before receiving the serialized package from the remote entity, and wherein:
      in an event that a version of a list of object types available to the remote entity is less recent than a version of a list of object types available to a client that receives the serialized package from the remote entity, the list of known object is the list of object types available to the remote entity;
      in an event that the version of the list of object types available to the remote entity is more recent than the version of the list of object types available to the client that receives the serialized package from the remote entity, the list of known object is the list of object types available to the client that receives the serialized package from the remote entity;
  responding to the determining, wherein the responding comprises instantiating a first object of the type and populating at least one property of the first object with information obtained from within the serialized package, wherein the instantiating and populating are performed when the identified type is within the list of known object types; and
  when the identified type is an unknown object type, responding to the determining, wherein the responding comprises instantiating a second object and populating at least one property of the second object with information obtained from within the serialized package.

19. The computer-readable storage medium of claim 18, wherein the list of known object types includes the first type as one of the known object types.

20. The computer-readable storage medium of claim 18, wherein the at least one sub-component comprises an unknown object having a type unidentified within the list of known object types.

21. The computer-readable storage medium of claim 18, wherein a first process on a system receives the serialized package and the remote entity comprises another process on the system.

22. The computer-readable storage medium of claim 18, wherein a first process on a system receives the serialized package and the remote entity comprises another process on another system.

23. The computer-readable storage medium of claim 18, wherein a first application domain executing within a process receives the serialized package and the remote entity comprises another application domain within the process.

24. The computer-readable storage medium of claim 18, wherein the serialized package comprises an XML document.

25. A system that communicates objects across a remote boundary, comprising:
   a processor;
   a memory, the memory being allocated for a plurality of computer-executable instructions which are loaded into the memory for execution by the processor, the computer-executable instructions providing a method for communicating objects across the remote boundary, the method comprising:
   negotiating with a remote entity to determine a list of known objects, the negotiating comprising:
      comparing a version of a first list of object types available to the remote entity with a version of a second list of object types available to a client that intends to transmit a computer-readable object to the remote entity;
      in an event that the version of the second list of object types is more recent than the version of the first list of object types, selecting the first list of object types to be the negotiated list of known objects; and
      in an event that the version of the first list of object types is more recent than the version of the second list of object types, selecting the second list of object types to be the negotiated list of known objects;
   decomposing the computer-readable object into multiple sub-components, including dividing the multiple sub-components into a hierarchy;
   creating a property bag in the hierarchy for holding information of the computer-readable object;
   in an event that a first sub-component of the multiple sub-components is included in the negotiated list of known objects, directly serializing the first sub-component without including any executable code of the first sub-component;
   in an event that a second sub-component of the multiple sub-components is not included in the negotiated list of known objects, creating a sub-property bag within the property bag for the second sub-component to form a hierarchical tree of property bags and recursively serializing properties of the second sub-component, wherein the hierarchical tree of property bags is limited by at least one act selected from the group consisting of:
      specifying a maximum depth of the hierarchical tree of property bags,
      supporting only certain object types and forcing object types that are derived from the certain object types to conform to respective types;
   serializing the multiple sub-components and the property bag into a serialized package; and
   transmitting the serialized package to the remote entity.

26. The system of claim 25, wherein a first process on the system transmits the serialized package and the remote entity comprises another process on the system.

27. The system of claim 25, wherein a first process on a system transmits the serialized package and the remote entity comprises another process on another system.

28. The system of claim 25, wherein a first application domain executing within a process transmits the serialized package and the remote entity comprises another application domain within the process.

* * * * *